Figure 1:
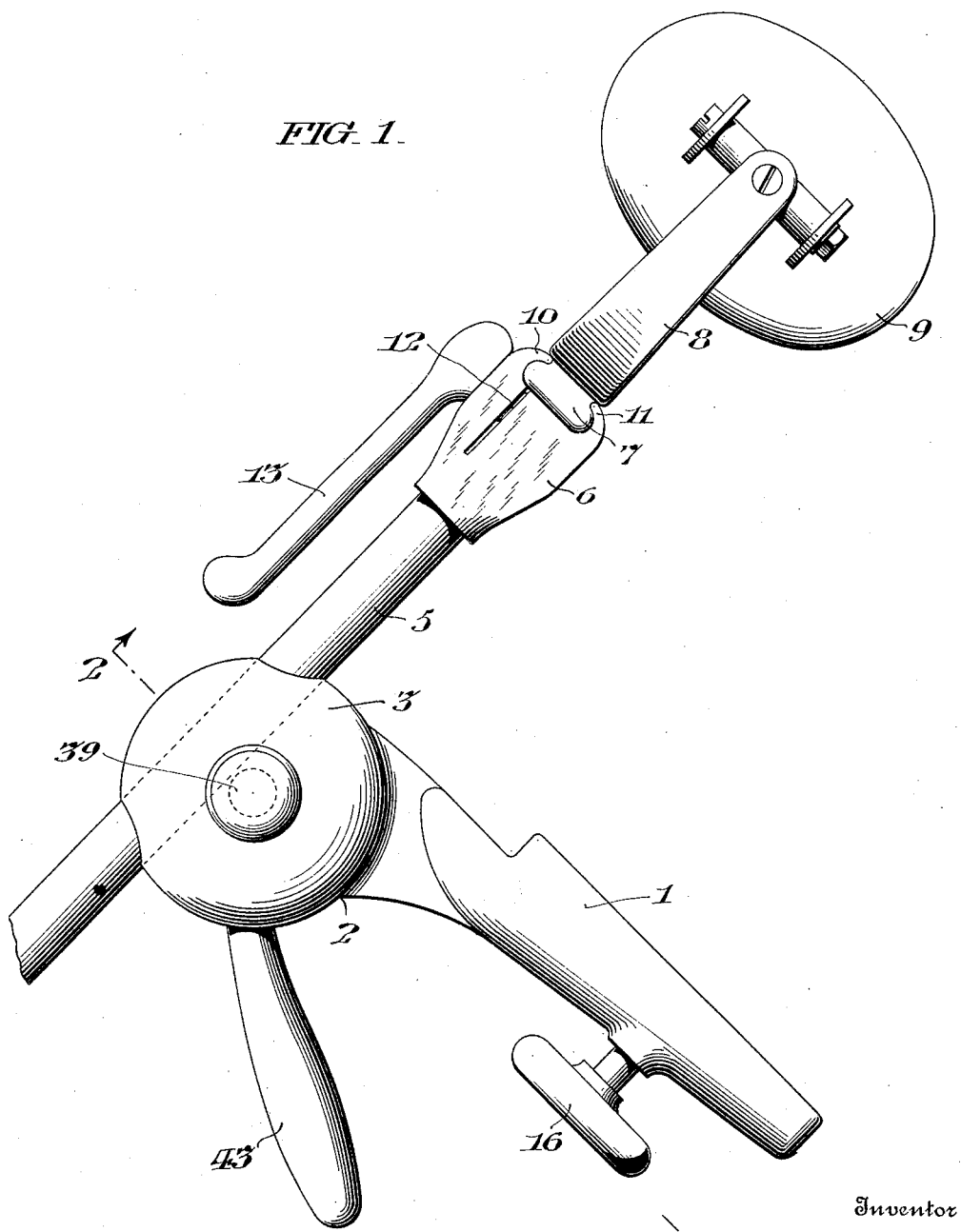

Nov. 1, 1932.  G. H. BROWNE  1,885,507

HEADREST

Filed April 2, 1929   2 Sheets-Sheet 1

Inventor
George H. Browne,
By Clifton C. Hallowell
Attorney

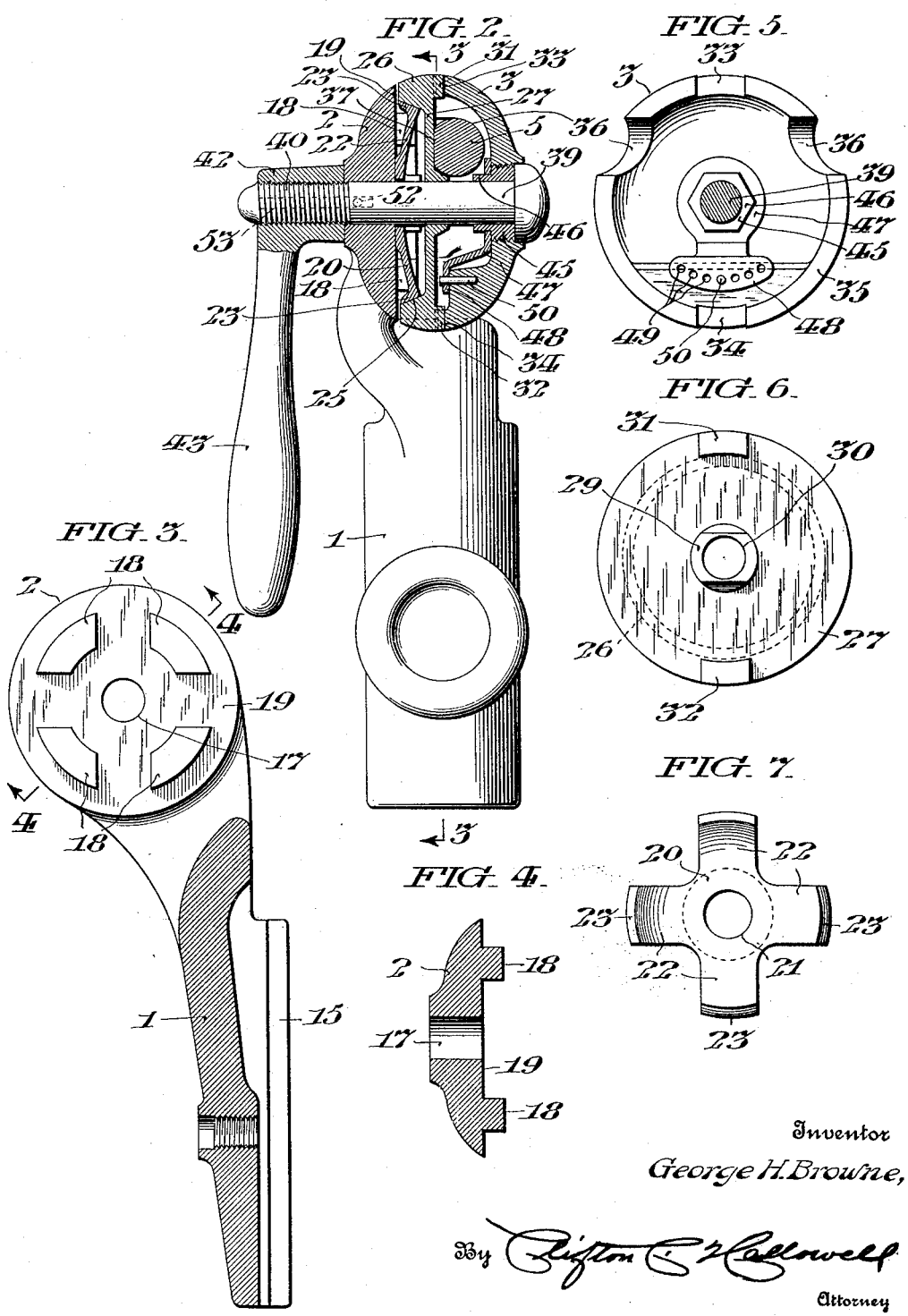

Patented Nov. 1, 1932

1,885,507

UNITED STATES PATENT OFFICE

GEORGE H. BROWNE, OF PRINCE BAY, NEW YORK, ASSIGNOR TO THE S. S. WHITE DENTAL MANUFACTURING COMPANY, A CORPORATION OF PENNSYLVANIA

HEADREST

Application filed April 2, 1929. Serial No. 351,875.

My invention relates particularly to head-rests for operative chairs such as dental chairs and the like, and is especially directed to the clamp which adjustably supports the head-rest pads or pillows in different variable adjusted positions with respect to the back and seat of the chair.

The principal objects of my invention are to provide a head-rest structure and its support with clamping means arranged to freely permit its adjustment in a wide range of positions and to rigidly clamp such head-rest structure and its support in any of such adjusted positions.

Other objects of my invention are to provide a clamp of such simplified construction that the parts may be readily assembled and segregated, thus affording easy replacement of said parts.

Further objects of my invention are to provide a head-rest clamp with means arranged to so regulate the operative parts thereof that the operative handle or lever for locking said parts may be disposed in a predetermined position convenient to the operator when set to rigidly clamp the parts of the head-rest assembly together.

My invention comprehends a clamp provided with locking members whose opposed frictionally engaged bearing surfaces conform to a cone, whereby any wear may be conveniently taken up and compensation therefor effected.

My invention further includes a head-rest clamp in which the locking members will automatically free themselves when released by movement of the lock-controlling handle or lever whereby any sticking or jamming of the parts is avoided.

Specifically stated, the form of my invention as hereinafter described comprises a head-rest having a support provided with a clamp and a head-rest pad or pillow carrying structure including a rod extended through said clamp and arranged to be pinched between clamping members which are arranged to rotate with respect to said head-rest support, said clamp having a dished or bowed spring locking member bearing upon the head of said support and peripherally engaging a frusto-conical surface forming a pocket in one of said clamping members, and means tending to bend said dished or bowed member into a plane and to expand its periphery into said frusto-conical pocket.

My invention also includes all of the various novel features of construction and arrangement as hereinafter more definitely specified.

In the accompanying drawings Figure 1 is a side elevational view of a head-rest assembly conveniently embodying my invention; Fig. 2 is a sectional elevational view of the assembly shown in Fig. 1 taken on the line 2—2 in said figure; Fig. 3 is a vertical sectional view taken longitudinally through the support on the line 3—3 in Fig. 2; Fig. 4 is a sectional view taken through the head of the support on the line 4—4 in Fig. 3; Fig. 5 is an inner face view of the cap which cooperates with the head to form a component part of the clamp; Fig. 6 is an outer face view of the rotatable clutch member as viewed from the right side of Fig. 2; and Fig. 7 is an outer face view of the dished or bowed spring clutch member as viewed from the right side of Fig. 2.

In said figures, the head-rest assembly comprises the support 1 having the clamping head 2 which is provided with the relatively movable dome-shaped hollow cap 3 through which the tang 5 of the head-rest carrying vise 6 extends. The head-rest frame is of well known construction being provided with the transverse bar 7 having the oppositely directed outwardly curved prongs 8, which rotatably support the opposed head-rest pads 9 in a well known manner. The head-rest bar 7 is arranged for lateral adjustment between the jaws 10 and 11 and may be rigidly secured thereto in adjusted position by the screw 12 having the handle 13 arranged to bind said jaws upon said head-rest bar, as is common and well known in the art.

The support 1 is arranged to be mounted to slide up and down on a suitably provided slideway on the back of a chair not shown, and is provided with opposed dove-tailed surfaces 15, which are arranged to cooperate with correspondingly shaped surfaces on the slide of the chair-back, and said support may be secured thereto by the thumb screw 16 in a manner common in the art.

As shown in Figs. 2, 3 and 4, the head 2 of the support 1 is circular in form and is provided with the central aperture 17 and the four relatively separated counterpart projections 18 extending outwardly from its flat surface 19 and serving as guides for preventing relative rotation of the bowed spring clutch member 20, which has the central aperture 21 and which is arranged to bear against the flat surface 19.

As best shown in Fig. 7, the bowed spring clutch member 20 serving as a connector, conforms generally to a Greek cross having its four arms 22 terminating in flanges 23, the outer surfaces of which each conforms to a sector of a conical frustrum and are arranged to frictionally bear upon the internal frustro-conical surface 25 of the inturned flange 26 of the relatively rotatable clutch member 27 which is interposed between said head 2 and cap 3.

As shown in Fig. 2, the arms 22 of the spring clutch member 20 are extended radially between the projections 18 on the head 2, whereby said spring clutch member 20 is prevented from rotating with the rotatable clutch member 27 when they are forced axially into frictional contact, as will be hereinafter described.

As shown in Figs. 2 and 6, the rotatable clutch member 27 is provided with the hub 29 having the aperture 30 and is also provided with the peripherally disposed lugs 31 and 32, which are diametrically arranged and which respectively extend into suitably provided recesses 33 and 34 in the peripheral edge 35 of the cap 3, whereby said rotatable clutch member 27 and cap 3 are interlocked to rotate together.

Said cap 3 is provided with alined recesses 36 which are arranged to receive the tang 5 and to hold its flat surface 37 against the outer surface of the rotatable clutch member 27 and to bind it thereagainst when the clamp is operated to rigidly engage its component parts together by the bolt 39.

As shown in Fig. 2, the bolt 39 extends through the apertures provided therefor in the component parts of the clamp structure and its threaded end 40 projects beyond the head 2 and is engaged by the threaded hub 42 of the adjusting hand lever 43 by the rotation of which the cap 3 and rotatable clutch member 27 are drawn together toward the head 2, which clamps the tang 5 between the cap 3 and clutch member 27 and tends to effect straightening of the bowed spring clutch member 20 into a plane to force the flanges 23 radially outward into engagement with the frustro-conical bearing surface of said rotatable clutch member 27.

It may be here noted that the recess 34 is slightly shallower than the recess 33 so as to afford a clearance between the opposed surfaces of said lug 31 and recess 33, and between the outer surface of the rotatable clutch member 27 and the peripheral edge 35, while the opposed surfaces of the lug 32 and recess 34 abut, so that when the hand lever 43 is rotated, the cap 3 may be drawn against the tang 5 to clamp it against the outer surface of the clutch member 27.

Obviously, it will be advantageous to have the lever 43 assume a predetermined position convenient to the operator when the composite parts of the clamp are drawn together, and therefore, I have provided a bushing 45 in threaded engagement with the cap 3 so as to be adjusted axially therein and afford an adjustable collar for the bolt 39. Said bushing is provided with the boss 46 which as shown is polygonal, but may be of any suitable form and which is arranged to be embraced by the retainer 47 having a similarly shaped aperture therein fitted to said boss, as shown in Figs. 2 and 5, said retainer 47 being provided with a sector 48 having a plurality of apertures 49, with any one of which the pin 50 may be engaged to hold the retainer 47 in adjusted position.

My invention is advantageous in that by a single movement of the hand lever 43 about the axis of the bolt 39, which is prevented from rotation by the pin 52 projecting into the slot or keyway 53 therein, the cap 3 is drawn axially toward the rotatable clutch member 27 to clamp the tang 5 in adjusted position, and the arms 22 of the spring clutch member 20 are thereby forced toward a common plane and their terminal flanges 23 frictionally jammed against the frustro-conical surface 25 to form a rigid clamp structure which may be clamped with any desired force, such as will absolutely prevent any relative movement of the component parts of the clamp.

It may be here noted that although I have elected to show the head 2 as being provided with the projections 18 and the rotatable clutch member as being provided with the flange 26 having the frustro-conical surface 25, it will be obvious that the same result may be obtained by providing the head 2 with the frustro-conical friction surface and the rotatable clutch member 27 with lugs or projections corresponding to the lugs or projections 18.

Furthermore, the cooperative friction bearing surfaces of the rotatable clutch member and the spring clutch member may be cylindriform instead of frustro-conical as illustrated, and therefore, it is not desired to limit my invention to the precise details of construction and arrangement as herein set forth, as it is obvious that various modifications may be made therein without departing from the essential features of my invention as defined in the appended claims.

Having thus described my invention, I claim:

1. A head-rest assembly including a clamp comprising relatively rotatable members arranged for relative movement toward and from each other, means for mounting said members, a bowed spring interposed between said relatively rotatable members and bearing axially against the one and having a plurality of flanged surfaces bearing radially against an opposed surface on the other, and means to cause said members to relatively approach and thereby tend to strain said spring and expand it radially to frictionally engage said bearing surfaces to unite said members.

2. A head-rest assembly including a clamp comprising suitably mounted relatively rotatable members arranged for relatively axial movement toward and from each other, a bowed yielding connector interposed between said relatively rotatable members and having a flanged frictional periphery, bearing axially against the one and radially against a friction bearing surface on the other, and means arranged to cause said members to relatively approach and tend to flatten said connector and expand it radially to cause its periphery to frictionally engage said bearing surface and thereby rigidly unite said members.

3. A head-rest assembly including a clamp comprising relatively rotatable members arranged for relative movement toward and from each other, a bowed spring connector interposed between said relatively rotatable members and bearing axially against the one and radially against the other, said spring connector and cooperative members having opposing friction surfaces, a bolt upon which said members are mounted, and means cooperative with said bolt to cause them to relatively approach and thereby tend to flatten said spring connector to expand it radially to frictionally unite said members, by direct contact therewith.

4. A head-rest assembly comprising a support having a head, a relatively rotatable member having a circular bearing surface mounted to move toward and from said head, a bowed spring spider having relatively spaced bearing surfaces for frictional engagement interposed between said head and rotatable member and arranged to bear axially against one and radially against the other for frictional engagement, a bolt extended through the structure thus assembled, and means on said bolt operative to cause said rotatable member to approach said head and effect flattening of said spider, tendng to expand it radially against said circular bearing surface and thereby frictionally unite the assembled parts together.

5. A head-rest assembly comprising a head-rest carrier having a tang and a support having a clamp providing a head, a relatively rotatable member mounted to move toward and from said head, a bowed spring spider interposed between said head and said rotatable member and bearing axially against the one and having peripheral flanges bearing radially against a peripheral friction surface of the other, a cap mounted against said rotatable member between which said tang may be adjustably clamped, a bolt extending through said clamp, and nut structure cooperatively associated with said bolt to draw said cap and rotatable member together against said tang and toward said head and thereby tending to cause said spider to flatten and expand radially to frictionally unite the assembled parts together, a bushing in threaded engagement with said cap and mounted on said bolt to serve as a collar therefor and being adjustable in said cap to vary the axial position of said bolt in said head.

6. A head-rest assembly comprising a head-rest carrier having a tang and a support having a clamp providing a head, a relatively rotatable member mounted to move toward and from said head, a bowed spring spider interposed between said head and said rotatable member and bearing axially against the one and having peripheral flanges bearing radially against a peripheral friction surface of the other, a cap mounted against said rotatable member between which said tang may be adjustably clamped, a bolt having cooperative means thereon extending through said clamp to draw said cap and rotatable member together against said tang and toward said head and thereby cause said spider to flatten and expand radially to frictionally unite the assembled parts together, a bushing having a polygonal extension in threaded engagement with said cap and mounted on said bolt to serve as a collar therefor and adjustable axially to vary the axial position of said bolt with respect to said head, and retaining means to prevent the rotation of said bushing when thus adjusted.

7. A head-rest assembly comprising a head-rest carrier having a tang and a support having a clamp providing a head, a relatively rotatable member mounted to move toward and from said head, a bowed spring spider interposed between said head and said rotatable member and bearing axially against the one and having peripheral flanges bearing radially against a peripheral friction surface of the other, a cap mounted against said rotatable member between which said tang may be adjustably clamped, a bolt extending through said clamp and having cooperative means arranged to draw said cap and rotatable member together against said tang and toward said head and thereby cause said spider to flatten and expand radially to frictionally unite the assembled parts together, a bushing having a polygonal extension in threaded engagement with said cap and mounted on said bolt to serve as a collar therefor and adjustable axially to vary the axial locking position of said bolt with respect to said head, and a retaining sector fitted to said extension and engaged with means in said cap to hold said bushing in different predetermined adjusted positions.

8. A head-rest assembly comprising a head-rest carrier having a tang and a support having a clamp providing a head, a relatively rotatable member mounted to move toward and from said head, a bowed spring spider interposed between said head and said rotatable member and bearing axially against the one and having peripheral flanges bearing radially against a peripheral friction surface of the other, a cap mounted against said rotatable member between which said tang may be adjustably clamped, a bolt having cooperative means thereon extending through said clamp to draw said cap and rotatable member together against said tang toward said head and thereby cause said spider to flatten and expand radially to frictionally unite the assembled parts together, a bushing in threaded engagement with said cap and mounted on said bolt to serve as a collar therefor and adjustable axially to vary the axial position of said bolt with respect to said head, and a retainer on said bushing having a plurality of apertures for retaining said bushing in different adjusted positions, and a pin in said cap with which any one of said apertures may be associated to prevent movement of said retainer and the consequent displacement of said bushing.

9. A head-rest assembly comprising a stationary head and a relatively rotatable structure, an expansible spring member having a conical bearing surface interposed between said stationary head and said rotatable structure, said surface bearing against a peripheral wall in said rotatable structure and means to draw said rotatable structure toward said stationary head to expand said spring member within said rotatable structure and thereby utilize said conical surface to frictionally bind said members together as an integral unit.

10. A head-rest assembly comprising a stationary head and a relatively rotatable structure, a bowed spring member having a conical periphery interposed between said stationary head and said rotatable structure, said surface bearing against a peripheral wall in said rotatable structure and means to draw said rotatable structure toward said stationary head and thereby tend to straighten said spring member to so engage its conical periphery within said rotatable structure as to frictionally hold said members together as an integral unit.

11. A head-rest assembly comprising stationary and rotatable structures, an expansible spring member interposed between said structures and having a conical friction bearing periphery, means to draw said structures toward each other thereby expanding said spring member to frictionally engage its conical bearing periphery with an opposing friction bearing surface on one of said structures.

12. A head-rest assembly comprising stationary and rotatable structures, an expansible spring member interposed between said structures and having a conical friction bearing periphery, means to draw said structures toward each other thereby expanding said spring member to frictionally engage its conical bearing periphery with an opposing friction bearing surface on one of said structures, and means to prevent rotation of said spring member relative to the other of said structures.

In witness whereof, I have hereunto set my hand this 30th day of March, A. D., 1929.

GEORGE H. BROWNE.